(12) United States Patent
Conde et al.

(10) Patent No.: US 11,584,368 B2
(45) Date of Patent: Feb. 21, 2023

(54) EVALUATING RISK FACTORS OF PROPOSED VEHICLE MANEUVERS USING EXTERNAL AND INTERNAL DATA

(71) Applicant: Intel Corporation, Santa Clara, CA (US)

(72) Inventors: Naissa Conde, San Jose, CA (US); Casey Baron, Chandler, AZ (US); Shekoufeh Qawami, El Dorado Hills, CA (US); Kooi Chi Ooi, Bukit Gambir (MY); Mengjie Yu, Foslom, CA (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 16/139,805

(22) Filed: Sep. 24, 2018

(65) Prior Publication Data

US 2019/0047559 A1    Feb. 14, 2019

(51) Int. Cl.
*B60W 30/095*    (2012.01)
*B60W 50/14*    (2020.01)
*G05D 1/00*    (2006.01)

(52) U.S. Cl.
CPC .... *B60W 30/0956* (2013.01); *B60W 30/0953* (2013.01); *B60W 50/14* (2013.01); *G05D 1/0088* (2013.01); *B60W 2050/146* (2013.01); *B60W 2552/00* (2020.02); *B60W 2554/00* (2020.02); *B60W 2555/20* (2020.02); *G05D 2201/0213* (2013.01)

(58) Field of Classification Search
CPC ................................................ B60W 30/0956
See application file for complete search history.

(56) References Cited

U.S. PATENT DOCUMENTS 8,849,494 B1 * 9/2014 Herbach .............. G05D 1/0297
                                                                    701/24
9,176,500 B1 * 11/2015 Teller ................... G05D 1/0088
(Continued)

FOREIGN PATENT DOCUMENTS

| CN | 106945636    | * | 1/2014 |
| EP | 1717778 A1   | * | 4/2005 |
| EP | 3217332 A1   |   | 9/2017 |

OTHER PUBLICATIONS

Google Machine Translation of CN 106945636 (Jan. 22, 2014).*
(Continued)

*Primary Examiner* — Jean Paul Cass
(74) *Attorney, Agent, or Firm* — Schwabe, Williamson & Wyatt, P.C.

(57) ABSTRACT

Apparatuses and methods for evaluating the risk factors of a proposed vehicle maneuver using remote data are disclosed. In embodiments, a computer-assisted/autonomous driving vehicle communicates with one or more remote data sources to obtain remote sensor data, and process such remote sensor data to determine the risk of a proposed vehicle maneuver. A remote data source may be authenticated and validated, such as by correlation with other remote data sources and/or local sensor data. Correlation may include performing object recognition upon the remote data sources and local sensor data. Risk evaluation is performed on the validated data, and the results of the risk evaluation presented to a vehicle operator or to an autonomous vehicle navigation system.

20 Claims, 8 Drawing Sheets

(56) References Cited

U.S. PATENT DOCUMENTS

| | | | |
|---|---|---|---|
| 9,947,224 B2* | 4/2018 | Fairfield | G08G 1/096725 |
| 10,269,141 B1* | 4/2019 | Shotan | G01S 7/4972 |
| 10,297,152 B1* | 5/2019 | Patel | G01S 17/89 |
| 10,421,453 B1* | 9/2019 | Ferguson | B60W 30/0953 |
| 10,432,912 B2* | 10/2019 | Wendel | G06T 7/80 |
| 10,466,694 B1* | 11/2019 | Fairfield | G05D 1/0044 |
| 2008/0312832 A1 | 12/2008 | Greene et al. | |
| 2016/0099010 A1* | 4/2016 | Sainath | G10L 25/30 704/232 |
| 2018/0018524 A1* | 1/2018 | Yao | G06V 10/82 |
| 2018/0060701 A1* | 3/2018 | Krishnamurthy | G06K 9/6273 |
| 2018/0075309 A1* | 3/2018 | Sathyanarayana | G06V 40/20 |
| 2018/0144219 A1* | 5/2018 | Kalisman | G06T 19/00 |
| 2018/0211117 A1* | 7/2018 | Ratti | G06N 3/0454 |
| 2018/0253567 A1* | 9/2018 | Gonzalez-Banos | H04N 21/8358 |
| 2019/0019349 A1* | 1/2019 | Dolgov | B60W 30/00 |
| 2019/0072966 A1* | 3/2019 | Zhang | G05D 1/0088 |
| 2019/0340462 A1* | 11/2019 | Pao | G06T 3/4053 |
| 2019/0364492 A1* | 11/2019 | Azizi | H04W 52/0261 |
| 2019/0384312 A1* | 12/2019 | Herbach | G05D 1/0038 |
| 2020/0055516 A1* | 2/2020 | Craddock | H04N 5/247 |

OTHER PUBLICATIONS

Extended European Search Report dated Feb. 26, 2020 for European Patent Application No. 19193451.2, 9 pages.

Gian Luca Foresti et al., "Multisensor Data Fusion for Autonomous Vehicle Navigation in Risky Environments", Sep. 1, 2002, 21 pages, IEEE Transactions on Vehicular Technology, IEEE Service Centre, vol. 51, No. 5, Piscataway, NJ, US.

Seong-Woo Kim et al., "Multivehicle Cooperative Driving Using Cooperative Perception: Design and Experimental Validation", Apr. 1, 2015, 48 pages, IEEE Transaction on Intelligent Transportaion Systems, IEEE, vol. 16, No. 2, Piscataway, NJ, US.

Office Action dated Apr. 9, 2021 for European Patent Application No. 19193451.2, 9 pages.

* cited by examiner

NON-TRANSITORY COMPUTER-READABLE STORAGE MEDIUM
1202

PROGRAMMING INSTRUCTIONS 1204,
CONFIGURED TO CAUSE A DEVICE, IN RESPONSE TO EXECUTION OF THE PROGRAMMING INSTRUCTIONS, TO PRACTICE (ASPECTS OF) EMBODIMENTS OF THE PROCESS(ES) DESCRIBED THROUGHOUT THIS DISCLOSURE.

FIG. 8

EVALUATING RISK FACTORS OF PROPOSED VEHICLE MANEUVERS USING EXTERNAL AND INTERNAL DATA

TECHNICAL FIELD

Embodiments described herein generally relate to vehicle navigation and driving assistance. In particular, apparatuses and systems for evaluating the risk factors of proposed vehicle maneuvers using a remote data source are described.

BACKGROUND

Modern vehicles, such as automobiles, may be equipped with various safety systems, such as blind spot detection, adaptive cruise control, and automatic emergency braking. These systems may be part of a computer assisted or fully autonomous driving (CA/AD) vehicle. A CA/AD vehicle may be configured with systems that assist a driver (such as lane keeping and automatic emergency braking), and/or partially or fully allow the vehicle to navigate autonomously (e.g. self driving vehicles). Assist and safety systems, as well as navigation and/or driving systems for fully autonomous vehicles, may use object detection and recognition to help ensure safe navigation and obstacle avoidance. To accomplish object detection and recognition, CA/AD vehicles may be equipped with a variety of sensors that provide data to various vehicle navigation systems. CA/AD vehicles may also include other vehicle types such as unmanned aerial vehicles (commonly referred to as "drones"), which likewise may use object detection and recognition as part of navigation and obstacle avoidance.

Along with various sensors, CA/AD vehicles may be configured for vehicle to vehicle (V2V) and/or vehicle to any (V2X) communications, such as with remote servers, to allow CA/AD vehicles to coordinate movements to help ensure safety. Such communications may be accomplished via radio links of various types, which allows the exchange of data between vehicles, including data from each vehicle's sensors, such as video and range finding.

BRIEF DESCRIPTION OF THE DRAWINGS

FIG. 8 illustrates a storage medium having instructions for practicing methods described with references to FIGS. 1-4, according to various embodiments.

DESCRIPTION OF EMBODIMENTS

Figure 1:
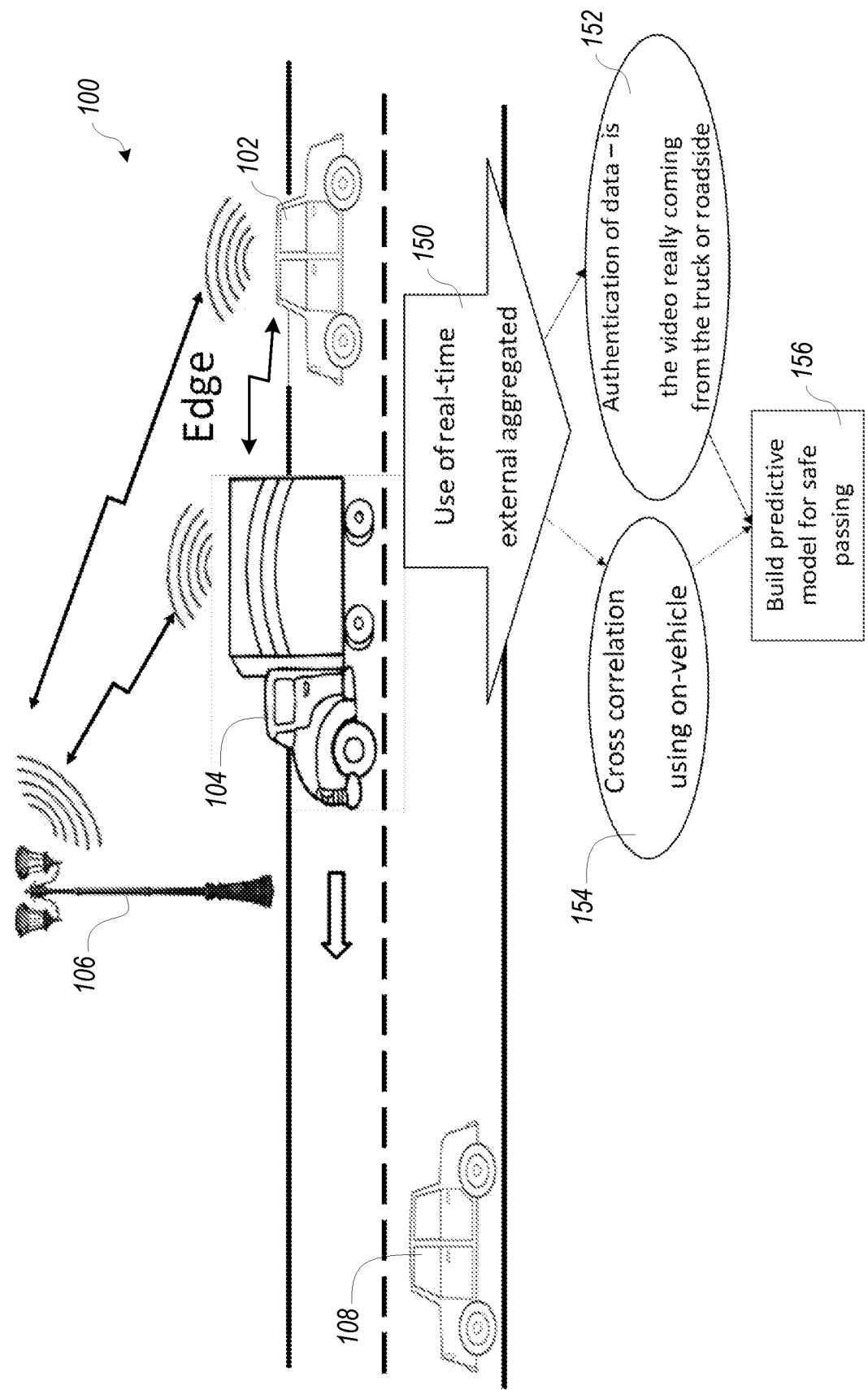
FIG. 1 is a diagram of a system for predicting the risk of a proposed vehicle maneuver using remote data sources, according to various embodiments.

Modern vehicles are often equipped with increasingly sophisticated computer assistance features to aid vehicle operators in situational awareness and safe operation. Such features include lane keeping assistance, blind spot detection, cross-traffic detection, adaptive cruise control, and emergency automatic braking. These various assistance features rely upon a variety of sensors placed upon the vehicle being operated to detect obstacles that are relatively proximate to the vehicle. By expanding the number and types of sensors, and with improvement of on-board processing power, the capabilities of assistance features may range up to fully autonomous driving systems, e.g. self-driving vehicles, with other vehicles offering greater or lesser degrees of autonomous driving.

Such assistance features are constrained to what sensors local to (e.g. on-board) the vehicle can detect, and so are largely ineffective and detecting potential obstacles and hazards that are either beyond the range of the local sensors or are obscured by an intervening obstruction, such as terrain or another vehicle. Consequently, the safety of maneuvers that require a knowledge of relatively distant obstacles, such as on-coming and/or upcoming traffic, cannot be readily ascertained in all scenarios. Knowledge of such distant obstacles could enable evaluation of the safety of vehicle maneuvers such as passing a vehicle, changing lanes, making a turn, or any other maneuver where the presence and relative speed of vehicles or objects ahead of the vehicle must be assessed.

Vehicles may be equipped for communications between vehicles or with remote servers (e.g., V2V or V2X communications) and configured to receive information via wireless communication links with other proximate vehicles. Depending upon the communications technology employed, these wireless communication links may allow vehicles to exchange sensor information, including data streams from video cameras, LIDAR, radar, range fingers, ultrasonic detectors, etc. By exchanging such data streams, a CA/AD vehicle can be enabled to evaluate the safety of proposed maneuvers that may be impacted by oncoming obstacles that are beyond the range of local sensors, or even obstructed by terrain, such as a hill or curve in the road. Proximate vehicle and stationary sources located further down the road from a CA/AD vehicle may be able to see and relay upcoming obstructions to the CA/AD vehicle prior to such obstructions being visible to the CA/AD vehicle's sensors, and so provide the CA/AD vehicle with sufficient time to evaluate the safety of a proposed vehicle maneuver. The evaluated risk can then either be presented to the vehicle operator to enhance the vehicle operator's situational awareness, or, in the context of an autonomous/self-driving vehicle, allow the CA/AD vehicle to determine when safe to perform a maneuver that may be prescribed by the vehicle's navigation system.

As used herein, the term semi-autonomous driving is synonymous with computer-assisted driving. The terms do not mean exactly 50% of the driving functions are automated. The percentage of driving functions automated may be a fraction of a percent to almost 100%.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts a system 100 for a vehicle to evaluate the risk factors of a proposed maneuver by the vehicle. In various embodiments, a first vehicle 102, equipped with an apparatus 200 that implements a method 300 as will be described herein, is configured to communicate with one or more remote data sources external to first vehicle 102, such as a second vehicle 104 and/or a stationary source 106 (which may be proximally located or remotely located). As used herein, references to first vehicle 102 include functionality provided by apparatus 200 as installed in first vehicle 102. Communications may be handled via any suitable wireless technology for vehicle to vehicle (V2V) or vehicle to any (V2X) communications. As will be described in greater detail herein, such technologies may include millimeter wave, cellular communications, Wi-Fi, or other such technologies that provide sufficient bandwidth to support the exchange of necessary data between the one or more remote data sources and first vehicle 102. In some embodiments, communications are direct point-to-point, e.g. first vehicle 102 and second vehicle 104 directly exchange data with each other via transceivers, or in other embodiments may be indirect, e.g. first vehicle 102 and second vehicle 104 exchange data using some intermediary. For example, first vehicle 102 and second vehicle 104 may rely upon a stationary source 106 to act as a local relay, as depicted in FIG. 1. In another example, first vehicle 102 and second vehicle 104 may relay data via a cloud or another remote service, such as using a cellular network data link. Other embodiments may utilize a combination of the foregoing, with some sources directly accessible and other sources requiring either a local or remote relay or intermediary.

A person skilled in the relevant art will appreciate that, in various embodiments, the selection of communications technology will depend upon the nature of the data to be exchanged with the one or more remote data sources. For example, remote data sources that offer high-definition video streams will necessitate a comparatively higher bandwidth communications technology compared to remote data sources that offer only standard-definition video. In embodiments, first vehicle 102 is equipped with communications technology for apparatus 200 with sufficient bandwidth to handle any expected driving scenario, e.g. the equipped communications technology is selected with respect to the maximum bandwidth required to communicate with any anticipated remote data source. Further, in embodiments, the equipped communication technology is selected with respect to the anticipated physical range of any proposed vehicle maneuvers. In other words, first vehicle 102 may be equipped with communication technology capable of exchanging data with any second vehicle 104 or stationary source 106 that is within the distance required to execute any proposed vehicle maneuver.

In embodiments, first vehicle 102 is a computer-assisted or autonomous driving (CA/AD) vehicle, with apparatus 200 providing at least some of the computer-assisted or autonomous driving functionality. Computer assistance may range from driver assist systems similar to blind spot and cross-traffic warnings (and including risk evaluation from apparatus 200), may include a level of automatic control, such as an emergency braking system or lane keeping system, or may range to full autonomous driving (a/k/a self driving or driverless) vehicles, which may be assisted by apparatus 200 in providing an evaluation to the autonomous driving systems of whether to execute a proposed maneuver. Thus, system 100 in conjunction with apparatus 200 (described herein below) can provide a risk assessment of a proposed maneuver to a driver or, in some embodiments, may work with an autonomous vehicle's navigation and steering systems to evaluate whether and when it is safe for the vehicle to execute proposed maneuvers. In embodiments, first vehicle 102 is equipped with apparatus 200. Apparatus 200 may be interfaced with first vehicle 102's computer assistance or autonomous driving system. For example, and as will be discussed in greater detail herein, apparatus 200 may receive input from first vehicle 102's navigation system, and/or may provide output via an infotainment system installed within first vehicle 102. In addition to passenger CA/AD vehicles, first vehicle 102 may comprise trucks, vans, busses, and commercial vehicles that may be equipped for computer assisted or autonomous driving. In some embodiments, first vehicle 102 may include boats, planes, drones, motorcycles, or other suitable conveyances that could be autonomously controlled.

Second vehicle 104 may be any other vehicle or conveyance located within communications range of first vehicle 102. In some examples, second vehicle 104 may be ahead of first vehicle 102, and either traveling in the same general direction as first vehicle 102, as depicted in FIG. 1, or traveling in the opposite direction, such as third vehicle 108. In other examples, second vehicle 104 may be laterally adjacent to or behind first vehicle 104, or traveling the opposite direction. First vehicle 102 may be in concurrent communication with multiple vehicles, such as second vehicle 104 as well as a third vehicle 108, in some embodiments. As used here, "concurrent communication" does not necessarily mean active transmitting/receiving from multiple vehicles at the same time, but rather that first vehicle 102 may have ongoing established and authenticated communication sessions with several vehicles at the same time, with actual data exchange occurring either simultaneously or in a sequential order.

Stationary source 106 may include any relatively fixed location adjacent to, over, or on the roadway that may be equipped with one or more sensors useable by first vehicle 102 with the apparatus and methods described herein. For example, stationary source 106 may include light stanchions, street signs, highway signs, overpasses, trees, buildings, terrain, or any other structure or feature proximate to the roadway where sensors can be mounted with a view of the roadway. Stationary source 106 may include sensors that would not ordinarily be found upon a vehicle, such as weather condition sensors to determine the presence of fog, haze, smoke, or other visual impediments, and roadway conditions such as wet, dry, snowy, icy, under construction, accident blockages/closures, etc., that may become factors in ascertaining the risk of a vehicle maneuver. Stationary, as used here, means stationary relative to the roadway. As a first vehicle 102 moves along the roadway, the position and distance of a stationary source 106 with respect to first vehicle 102 will change, with a stationary source 106 potentially coming into range and leaving range of first vehicle 102.

In embodiments, first vehicle 102 receives one or more types of data from the various data sources of second vehicle 104, stationary source 106, and/or third vehicle 108. The various data sources may include video, audio, LIDAR, radar, ultrasonic, and similar types of detectors or sensors of second vehicle 104, stationary source 106, and/or third vehicle 108 for the external environment of first vehicle 102, as well as internal sensors such as speed, acceleration, and equipment status such as whether the brakes are applied, the throttle is applied, turn signal actuation, anti-lock brake system status, rain sensors, wiper actuation, and/or any other similar data from second vehicle 104, stationary source 106, and/or third vehicle 108, that may be used by first vehicle 102 to assess risk of a maneuver by vehicle 102. It will be understood that the types of data will depend upon the nature of the data source. For example, where first vehicle 102 communicates directly with each source (no intermediary relay), stationary source 106 would not provide vehicle-specific data points such as speed and brake status. Some data sources may not be equipped with certain sensors, e.g. second vehicle 104 may only be equipped with a video camera, but not have any range finding sensors such as LIDAR or radar, or vice-versa. Further, other data sources may be equipped with a range of sensors, but may be able to selectively enable or disable broadcasting and/or receiving information to or from one or more of the range of sensors.

FIG. 1 further depicts the general operation of system 100 according to embodiments. Per operation 150, first vehicle 102 collects real-time data from the various remote sources external to first vehicle 102, which may include second vehicle 104, stationary source 106, and third vehicle 108. Data sources may further include remote sources such as weather and traffic data (e.g. as may be provided by services such as WAZE®). The data is aggregated, merged, reconciled, or otherwise combined, and, in operation 152 is authenticated as will be discussed in greater detail herein. In operation 154, the various remote sources may be cross-correlated, both with each other (e.g. where first vehicle 102 obtains data from multiple remote sources) as well as with any local sensors on-board first vehicle 102. Using authenticated and cross-correlated data, first vehicle 102 can build a predictive model for predicting/estimating the risk associated with executing a proposed vehicle maneuver in operation 156.

Proposed maneuvers may include any maneuvers where the condition of the roadway ahead of first vehicle 102 is relevant to determining the risk presented by the proposed maneuver. Proposed vehicle maneuvers may include maneuvers such as passing a vehicle, changing lanes, making a turn, or any other maneuver where the presence and relative speed of vehicles or objects ahead of the vehicle must be assessed to determine whether the maneuver may be safely executed.

Figure 2:
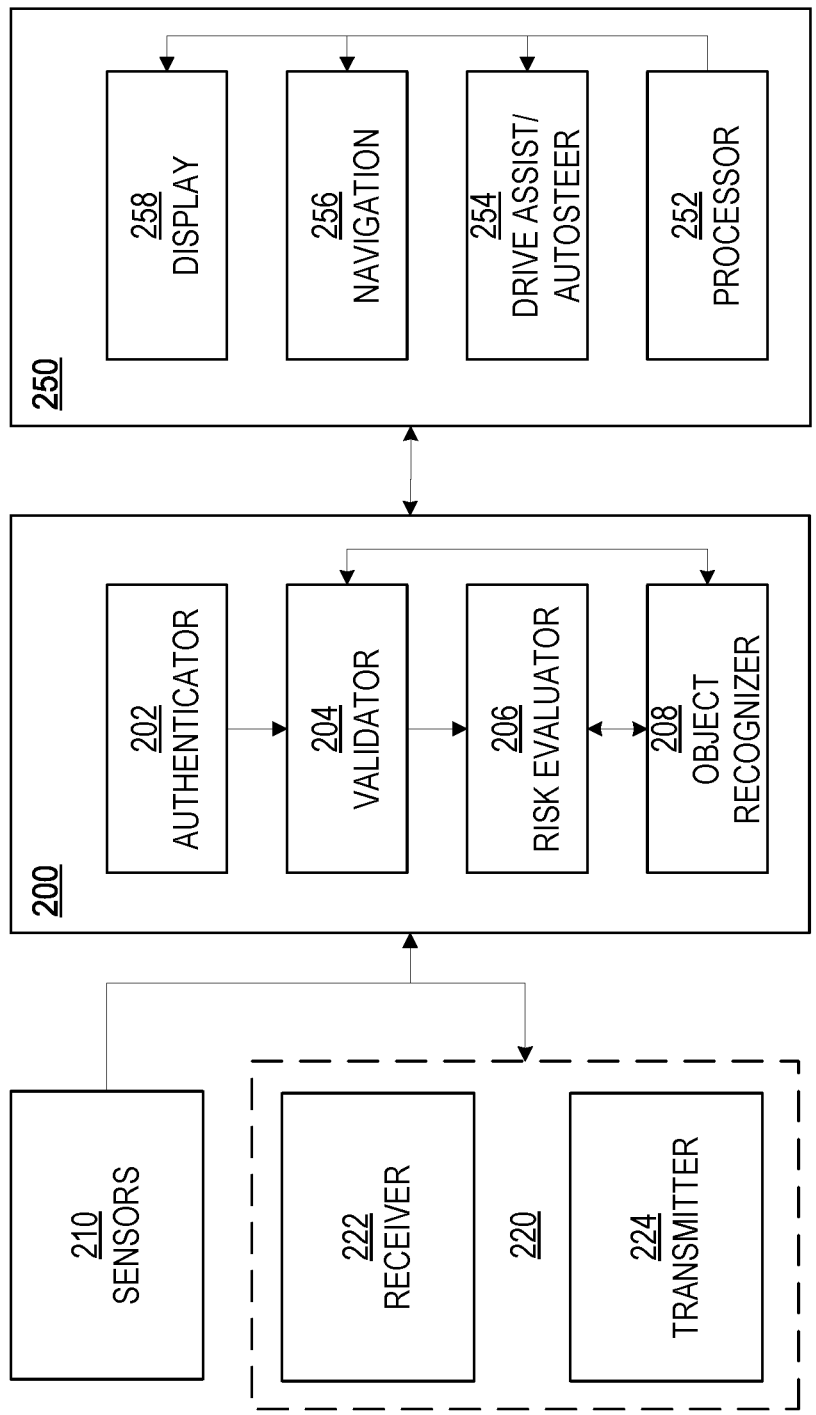
FIG. 2 is a block diagram of an apparatus and supporting devices that receives information from remote data sources and uses the information to predict risks of proposed vehicle maneuvers, that may be equipped to a vehicle depicted in FIG. 1, according to some embodiments.

FIG. 2 depicts a block diagram of an apparatus 200, which may be equipped to first vehicle 102, for assessing the risk of a proposed maneuver by first vehicle 102, according to various embodiments. In some embodiments, apparatus 200 includes an authenticator 202, a validator 204, and a risk evaluator 206. Apparatus 200 may include an object recognizer 208 to assist the risk evaluator 206 in processing data from the various remote data sources for risk evaluation. Apparatus 200 receives data from one or more sensors 210, in some embodiments, that are also equipped to first vehicle 102. Apparatus 200 may exchange data from remote sources such as second vehicle 104, stationary source 106, and third vehicle 108 via a transceiver 220. Apparatus 200 further may be in communication with a vehicle infotainment system 250, which may provide navigation and interaction with a user/operator of the vehicle.

In embodiments, authenticator 202 handles verifying the source of remote data received through transceiver 220, such as data received from second and third vehicles 104 and 108 and/or stationary source 106. Authentication may include, in some embodiments, receipt or exchange of keys with a remote data source to ensure the data is not coming from a spoofed source. For example, a remote source may utilize a public-private key arrangement (e.g. asymmetric encryption) where the remote source provides a public key to authenticator 202 and uses its private key to encrypt some or all of the data provided to authenticator 202. Other methods may be employed for verification, such as third party authentication, where apparatus 200 may verify credentials from a remote data source with a third party (e.g. cloud-based or remote) service. Still other embodiments may employ any suitable technique now known or later developed for authenticating data from a remote source. Authenticator 202 may perform an authentication process for each remote data source received by apparatus 200. Authentication may occur on a per-session basis, e.g. each time a remote data source enters into range and apparatus 200 initiates communication, on a per transmission basis, where the remote data source is authenticated upon each transmission of a data stream, or at such other frequency as appropriate and/or may be programmed for a given implementation.

Validator 204, according to embodiments, receives authenticated data from the remote data source, such as via authenticator 202, to ensure data reliability. Validator 204 may receive data from multiple remote data sources, and may further receive data from sensors 210. In embodiments, received data may be correlated across sources to ensure that each remote data source is providing not only accurate data, but also data that is directed to the same physical region relevant to the proposed vehicle maneuver. Correlation may include comparing data from a first remote data source, such as second vehicle 104, with a second data source, such as data from sensors 210 local to first vehicle 102, or a second remote source, such as stationary source 106 and/or third vehicle 108. For example, where second vehicle 104 and stationary source 106 are each equipped with video cameras, their respective video streams may be compared against each other to ascertain whether objects that appear in one video stream likewise appear in the other, with adjustments/transformations performed as necessary to compensate for different camera angles. Similarly, different types of data may be compared, such as objects in a video stream from one remote source correlated with detected objects in a LIDAR or radar scan from a second remote source.

As shown in FIG. 2, an object recognizer 208 may interface with validator 204 to perform object recognition on data streams from the various data sources, including both remote data sources and data from sensors 210. Object recognition, as described above, may allow objects detected in each data source to be correlated to validate each of the various data sources. The particular algorithms employed by object recognizer 208 may depend upon the nature of the data source being analyzed. Video streams may require a different type of object recognition than data from a LIDAR or radar sensor, for example. Object recognizer 208 may employ any algorithm now known or later developed that is suitable for use with a given data source.

Once the remote data source or sources have been validated, in various embodiments they are provided to risk evaluator 206, which also receives data from various sensors 210 local to first vehicle 102 as described above. Risk evaluator 206 receives a proposed vehicle maneuver and, using the remote data sources and sensors 210, determines the risk of the maneuver. As the risk evaluation is based upon object detection, risk is expressed in terms of the likelihood that a proposed maneuver will result in collision with at least one of a detected object. As will be described further herein, risk may be classified into at least three categories: no risk of collision, a moderate risk of collision, and a high risk or imminent collision. Determining between no/low risk, moderate risk, and high risk may be expressed based upon a distance threshold, i.e. how close any portion of vehicle 102 will come within one or more detected objects. A predetermined distance threshold may be established. Where first vehicle 102 will likely be further from any detected object than the distance threshold, the risk may be determined as low or none. If first vehicle 102 will likely travel within the distance threshold to any detected object (viz. closer to the object than the distance threshold), then the risk may be determined as moderate. If first vehicle 102 will likely collide or otherwise contact a detected object, then the risk may be determined as high, More than one threshold may be established in various embodiments; for example, a second threshold, closer in distance to a detected object, may be used to establish a high risk, rather than requiring a likely collision as the criteria for high risk. In still other embodiments, other variables may be factored into assessing risk, i.e. the likelihood that the maneuver might result in injuries to a pedestrian, an occupant of the vehicle, damages to the vehicle or other vehicles or structures, which can depend upon the speed of first vehicle 102.

Local sensor data may include measurements from sensors 210 relevant to vehicle status and condition such as vehicle speed, acceleration, engine speed (e.g. revolutions per minute), gear, throttle position, brake position, antilock brake system status, traction control status, and any other measurements relevant to evaluating a vehicle maneuver. Further, sensors 210 may include external sensors appropriate to CA/AD vehicles, such as LIDAR, radar, ultrasonic sensors, range finders, video cameras, and other similar sensors that provide input to a CA/AD vehicle's driver assist and/or navigation systems. Risk evaluator 206, as shown in FIG. 2, may be in communication with object recognizer 208, similar to validator 204, and may utilize objects recognized from each remote data source as well as sensors 210 in determining the risk and risk factors of a proposed vehicle maneuver. Sensors 210 may be integrated into apparatus 200 in some embodiments, or in other various embodiments, may be partially or wholly separate from apparatus 200.

In embodiments, risk evaluator 206 evaluates the remote data source or sources, such as via object recognizer 208, to locate objects such as vehicles, plants, signs, and other such potential obstacles that are proximate to the path to be taken by first vehicle 102 in executing the proposed maneuver. In locating such objects, the movement of any such objects, e.g. speed, acceleration, and/or direction of travel, as detected in the remote data sources may also be evaluated. With this evaluation, risk evaluator 206 may further factor in data from sensors 210 relevant to the status and condition of first vehicle 102, in particular, data indicating first vehicle 102's path and rate of travel. Risk evaluator 206 may employ geometric algorithms across the data and project the path of first vehicle 102 in executing the proposed maneuver, as well as the projected path of any detected objects, to determine whether it will result in a collision with any of the detected objects, result in first vehicle 102 passing unacceptably close to any detected object, or if first vehicle 102 may travel the projected path without conflict from any detected object.

Whether first vehicle 102 passes unacceptably close to a detected object may depend upon whether first vehicle 102 passes within a predetermined threshold for maintaining separation between detected objects and first vehicle 102. This predetermined threshold may itself vary depending upon the speed of first vehicle 102 relative to any obstacles, and may vary on a per-obstacle basis. For example, an obstacle moving towards first vehicle 102 may have a higher predetermined threshold than a non-moving obstacle, which may in turn have a higher threshold than an obstacle moving away from first vehicle 102 (which may have no threshold or be a non-factor), as the relative speed of an obstacle moving towards first vehicle 102 is greater than the speed at which first vehicle 102 may be approaching a stationary obstacle. The predetermined threshold may vary based upon road conditions, with a threshold being greater where road conditions are adverse, such as wet, icy or snowy pavement, in areas of rain, fog or smoke, or any other environmental conditions that may impact visibility and/or vehicle traction and control. The predetermined threshold may be calculated dynamically by apparatus 200, in real-time based upon input from remote data sources and local sensors 210, with some embodiments calculating multiple thresholds on a per-object basis.

Where first vehicle 102 is a computer-assisted vehicle (as opposed to autonomous driving), the proposed maneuver may be determined on the basis of signal inputs from the vehicle operator, as well as detection of road markings. For example, risk evaluator 206 may detect or be informed that the vehicle operator has actuated the left turn signal. If first vehicle 102 is maintaining speed, then risk evaluator 206 may examine lane markings. If the lane marking indicate a two lane road, then risk evaluator 206 can conclude that the vehicle operator intends to pass a vehicle ahead of first vehicle 102. This may be confirmed if first vehicle 102 is equipped with sensors 210 that can detect the presence and closing range of a vehicle, such as second vehicle 104, in the lane immediately in front of first vehicle 102. Apparatus 200 may initiate communications with second vehicle 104 to obtain a remote data feed from second vehicle 104, that may further include a video feed that apparatus 200 can use to determine the presence of any vehicles (or other obstacles) ahead of second vehicle 104, as well as the possible presence of oncoming traffic. Risk evaluator 206 can use this information, such as the rate of closure of any oncoming traffic, to determine the risk of attempting a passing maneuver.

In another example, risk evaluator 206 may determine that the lane markings indicate a multi-lane highway, and with the left turn signal, conclude that the vehicle operator is simply intending to make a lane change. As with a passing maneuver, apparatus 200 may utilize remote data sources from vehicles and stationary sources ahead of first vehicle 102 to determine whether the proposed lane change can be made safely, or if an obstruction is present ahead in the lane.

In yet another example, sensors 210 may indicate to risk evaluator 206 that the vehicle operator has applied the brakes and is slowing down. In conjunction with the left turn signal, risk evaluator 206 may conclude that the vehicle operator intends to make a left hand turn. As with a lane change, remote data sources may be used to ascertain whether the left turn can be made safely, or whether there is oncoming traffic that poses a risk of collision. The foregoing are only examples; other possible signals may be ascertained by apparatus 200.

In embodiments where first vehicle 102 is an autonomous driving vehicle, apparatus 200 may receive input directly from the vehicle's navigation and/or autosteering systems in the form of intended maneuvers, as will be described further herein. In such embodiments, reference to external cues such as lane markings may be unnecessary. In other embodiments, a vehicle operator may directly signal apparatus 200 of the intended maneuver, such as by voice cues or via an interface.

In some embodiments, apparatus 200 may not establish contact with remote data sources until it receives an indication of a proposed vehicle maneuver. In other embodiments, apparatus 200 may establish contact with remote data sources whenever they are sufficiently proximate to apparatus 200 to establish reliable communications, regardless of whether a proposed vehicle maneuver is indicated. In still other embodiments, contact may be established with remote data sources on the basis of other CA/AD vehicle operations that require or are facilitated by an exchange of data with other vehicles, and so apparatus 200 may advantageously use such established communications sessions. In some such examples, authenticator 202 may not need to authenticate remote data sources when the remote data sources are authenticated by another aspect or function of the CA/AD vehicle. In other such examples, authentication may be carried out by authenticator 202 and relied upon by the other aspect(s) or function(s) of the CA/AD vehicle. It should be understood that any of the foregoing scenarios may be realized by a single apparatus 200, viz. some remote data sources may be established and authenticated outside of apparatus 200, while apparatus 200 may handle establishing and authenticating other remote data sources, which may then be used by other aspect(s) or function(s) of the CA/AD vehicle.

Once the risk of a proposed maneuver has been calculated by risk evaluator 206, in various embodiments, the assessment is communicated to infotainment system 250, and, for embodiments in computer-assisted vehicles, for presentation on a display 258 to a vehicle operator. In some such embodiments, the risk assessment may be presented to the vehicle operator in a "traffic light" fashion, with relative risks presented as red (indicating that the proposed vehicle maneuver will, barring an evasive maneuver, result in a collision), yellow (indicating that the proposed vehicle maneuver will bring the vehicle within the predetermined threshold distance discussed above with at least one obstacle and so is potentially dangerous), or green (indicating that, barring an unexpected change in direction by any obstacles ahead in the road, the proposed vehicle maneuver may be safely executed without risk of collision). In various embodiments, the red/yellow/green presentation may be conveyed to the vehicle operator via a heads-up display, dash panel/instrument cluster, vehicle navigation screen, dedicated lights, or via any other aspect of display 258 so that a vehicle operator can readily understand the risk assessment without being unduly distracted from driving. Other embodiments may present the risk assessment in a different fashion; any method of conveying the risk assessment to a vehicle operator without unduly distracting the operator may be employed. In some embodiments, the display of the risk assessment may be customized by the vehicle operator to suit the operator's preferred method of information presentation. Some embodiments may engage in periodic or continuous assessment of risk factors, such as from updated data received from both local sensors 210 and one or more remote data sources. As the risk assessment is updated, the vehicle operator may likewise be provided with periodic or continuous updates of the risk assessment, such as when conditions change.

It will further be appreciated that, in embodiments where first vehicle 102 is either an autonomous driving vehicle or a CA/AD vehicle in autonomous mode, such as where apparatus 200 receives indications of a proposed vehicle maneuver through a navigation unit 256, the risk assessment may not be presented to the vehicle operator, as the vehicle operator is not actively controlling first vehicle 102 in such embodiments. Moreover, in such embodiments apparatus 200 may forego a "yellow" assessment, and instead simply inform a drive assist/autosteer unit 254 whether/when it is safe to execute the proposed vehicle maneuver (e.g. a "green" assessment). Risk evaluator 206, in such embodiments, may simply calculate a safe/unsafe determination, based upon the predetermined thresholds discussed above; any assessment that would fall into the "red" (e.g. imminent collision) or "yellow" (e.g. high risk of collision) category would result in an unsafe determination.

In addition to the aforementioned display 258, drive assist/autosteer unit 254, and navigation unit 256, infotainment system 250 may, in various embodiments, include one or more processors 252. Drive assist/autosteer unit 254 and navigation unit 256 may be any appropriate technology now known or later developed for a CA/AD vehicle that assists a vehicle operator in navigation and control, up to complete autonomous driving. Drive assist/autosteer unit 254 may provide for little to full control of a first vehicle 102, depending upon a given implementation. Navigation unit 256 may include a GPS receiver along with various other sensors for determining vehicle orientation and position, and may provide input to the drive assist/autosteer unit 254 to guide first vehicle 102 to a selected destination. Both drive assist/autosteer unit 254 and navigation unit 256 may provide feedback to a vehicle operator via display 258, such feedback including driver assist cues and navigational information, e.g. turn by turn navigation instructions.

Display 258 may be any suitable display technology, such as a touch-screen flat panel LCD, LED, or OLED display in some embodiments. As suggested above, display 258 need not be a single display; display 258 may encompass several different devices for providing feedback to a vehicle operator. For example, in some embodiments, display 258 include both a conventional screen as well as a heads-up display and/or instrument cluster display. Some embodiments may include the instrument cluster as part of display 258.

Processor 252 may be a general purpose or application specific processor. For example, processor 252 may be a processor 504 that is part of a computer device 500, as described herein with respect to FIG. 5. As seen in FIG. 2, processor 252 is in data communication with at least drive assist/autosteer unit 254, navigation unit 256, and display 258. As mentioned above, depending upon the particular embodiment of apparatus 200 and infotainment system 250, processor 252 may comprise multiple processors. Each block of apparatus 200 (authenticator 202, validator 204, risk evaluator 206, object recognizer 208) and/or block of infotainment system 250 may utilize one or more of its own processors 252. In other embodiments, a single processor 252 may coordinate the operations of all blocks of apparatus 200 and/or infotainment system 250.

One or more components of apparatus 200, including authenticator 202, validator 204 and/or risk evaluator 206, in embodiments, include or is implemented using, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors such as general-purpose processors that may be used for general-purpose computing, and/or microprocessors that are purpose-built, such as specifically for processing of digital signals, and more specifically for processing of digital audio signals. Examples may include processors of the iAPX family, ARM family, MIPS family, SPARC family, PA-RISC family, POWER family, or any other suitable processor architecture now known or later developed. Still other embodiments may use an application-specific integrated circuit (ASIC) or field-programmable gate array (FPGA).

It should be understood that in other embodiments of apparatus 200, authenticator 202, validator 204, risk evaluator 206, and object recognizer 208 may use a different arrangement of components, including different types. For example, in one particular embodiment, apparatus 200 is implemented as software, such as instructions 604 stored on a medium 602 (described further with respect to FIG. 6) to be executed by a computer device 500 (described herein with respect to FIG. 5). In other embodiments, portions of apparatus 200 may be implemented as software, with other portions implemented in hardware. It will be appreciated the various blocks in FIG. 2, including those of apparatus 200 as well as infotainment system 250, are simply logical depictions of functions; the actual implementation of the blocks can vary from embodiment to embodiment, with functions of different blocks potentially being split or combined into one or more software and/or hardware modules. Some of the components may be omitted or moved to other locations, depending upon a given implementation.

Embodiments of apparatus 200, as discussed above, are in communication with one or more radios capable of transmitting and receiving signals using various suitable wireless communications techniques. One possible embodiment is transceiver 220, which includes receiver 222 circuitry and transmitter 224 circuitry. Other embodiments may use a discrete receiver 222 that is separate from a discrete transmitter 224. Communications techniques may involve communications across one or more wireless networks. Some example wireless networks include (but are not limited to) wireless local area networks (WLANs), wireless personal area networks (WPANs), wireless metropolitan area networks (WMANs), cellular networks, and satellite networks. In communicating across such networks, the transceiver 220 (which term contemplates embodiments with integrated receive/transmit circuitry as well as embodiments with either or both discrete receiver 222/transmitter 224 circuitry) may operate in accordance with one or more applicable standards in any version. To this end, the transceiver 220 may include, for instance, hardware, circuits, software, or any combination thereof that allows communication with external computer systems.

In some specific non-limiting examples, the transceiver 220 may comport with the Institute of Electrical and Electronics Engineers (IEEE) 802.11 standard (e.g., Wi-Fi), a Bluetooth®, ZigBee®, near-field communication, or any other suitable wireless communication standard. In addition, the transceiver 220 may comport with cellular standards such as 3G (e.g., Evolution-Data Optimized (EV-DO), Wideband Code Division Multiple Access (W-CDMA)) and/or 4G wireless standards (e.g., High Speed Packet Access (HSPA), Worldwide Interoperability for Microwave Access (WIMAX), Long-Term Evolution (LTE)).

Apparatus 200, in some embodiments, is a standalone unit, capable of being attached or interfaced with a vehicle. In other embodiments, apparatus 200 is provided as an integral part of a vehicle, and may be in communication with a vehicle's navigation systems, if so equipped. In still other embodiments, apparatus 200 may be a part of a vehicle's autonomous driving, computer assistance, or navigation systems.

Figure 3:
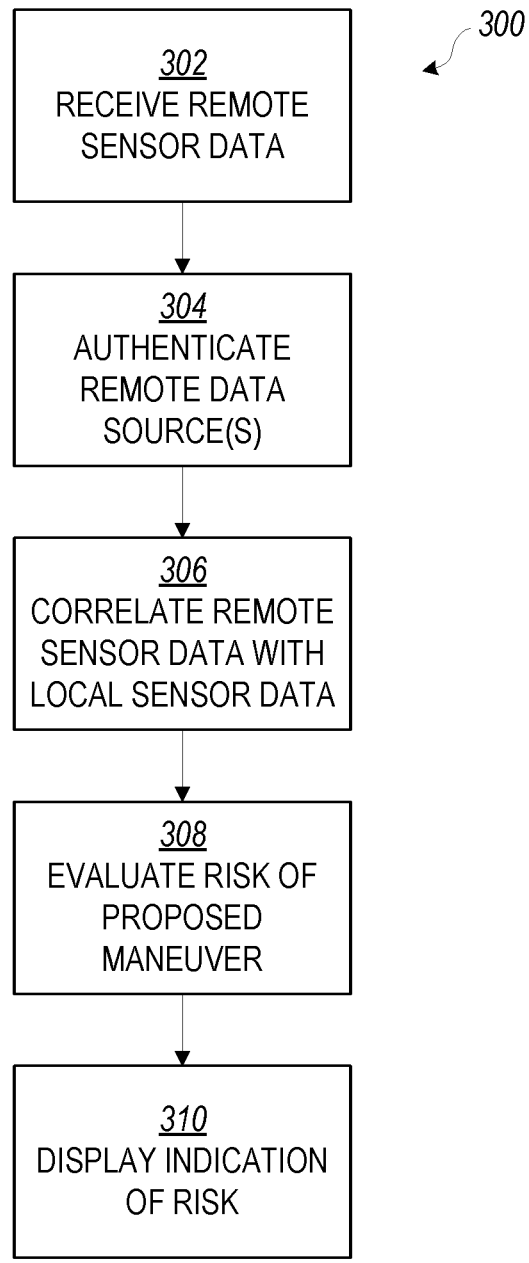
FIG. 3 is a flowchart of a method for using remote information to predict risks of proposed vehicle maneuvers, that may be executed by the apparatus of FIG. 2, according to various embodiments.

In FIG. 3, a flowchart of the various operations of a method 300 that may be carried out in whole or in part by an apparatus 200 is depicted. In operation 302, apparatus 200 may establish communications sessions with, and receive remote data from, one or more remote data sources, such as second vehicle 104, third vehicle 108, and stationary source 106, as described above with respect to FIG. 1. The remote data from each of the one or more remote data sources is authenticated in operation 304, such as by authenticator 202 as described above.

In operation 306, the authenticated remote data from each of the one or more remote data source is validated and correlated with other remote data sources (where there are a plurality of remote data sources) and/or with local sensor data. The logical operations of operation 306 will be discussed in more detail below with respect to FIG. 4.

In operation 308, the correlated and validated remote data is used to evaluate the risk of a proposed vehicle maneuver, as discussed above with respect to the functions of risk evaluator 206. In embodiments/implementations where a vehicle operator is controlling first vehicle 102, the results of the risk evaluation are displayed or otherwise provided to the vehicle operator in operation 310, as described above with respect to risk evaluator 206 and FIG. 2.

Figure 4:
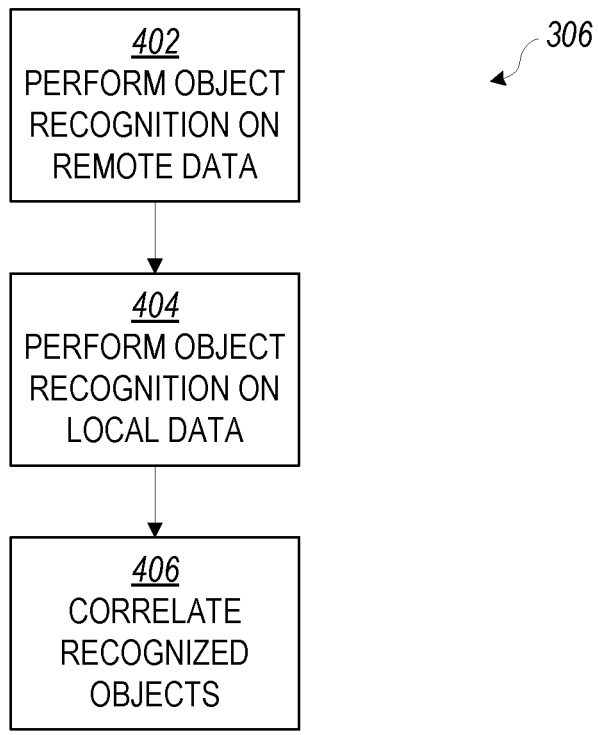
FIG. 4 is a flowchart of a method for correlating data from a remote source with data from local sources that may be carried out as part of FIG. 3, according to various embodiments.

FIG. 4 is a flowchart of the operations that may be executed in whole or in part by an apparatus 200 that is performing or executing operation 306, to validate and correlate the one or more remote data sources. In operation 402, object recognition may be performed on each remote data source in the one or more remote data sources, such as by using object recognizer 208, as described above. In operation 404, object recognition may be performed, such as by object recognizer 208, on local data obtained from local sensors, such as sensors 210. If local data need not be used, e.g. where there are sufficient authenticated remote data sources to perform correlation and validation, operation 404 may be omitted. Finally, in operation 406, the recognized objects from the remote data sources and/or local data are correlated, with any necessary transforms or mapping of reference frames performed to facilitate correlation.

The operations depicted in FIG. 4 may be carried out wholly or partially by validator 204 of apparatus 200, or, depending upon the particulars of a given implementation, by another block, such as authenticator 202 and/or risk evaluator 206. Some embodiments may execute operation 306 of method 300 using different operations than those depicted in FIG. 4, viz. some embodiments may not need to use object recognition, or may use data types that are not well suited to object recognition, and so may be correlated using other techniques, such as pattern matching.

Figure 5:
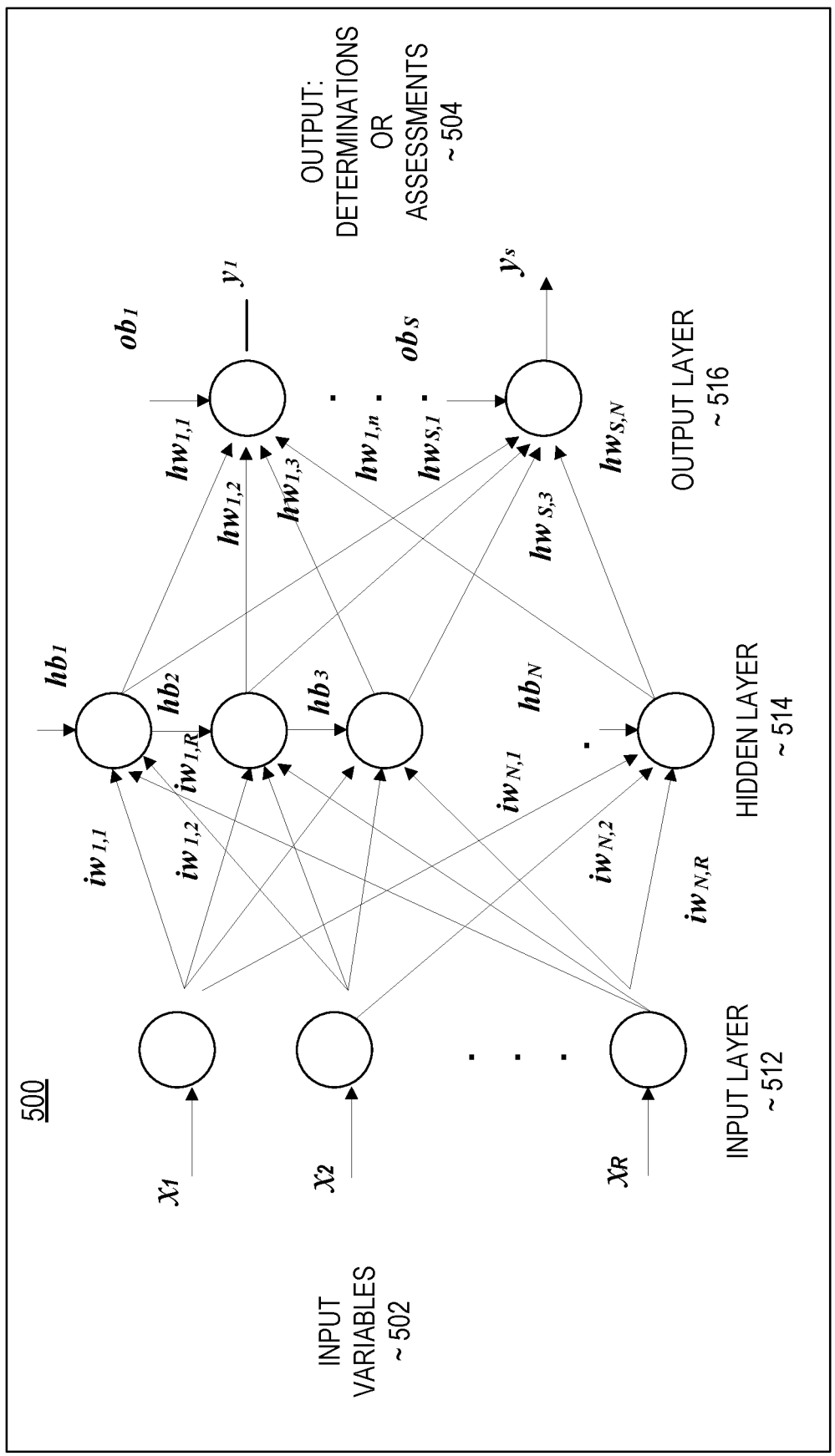
FIG. 5 illustrates an example neural network suitable for use with the present disclosure, according to various embodiments.

In some embodiments, apparatus 200, and in particular, risk evaluator 206, may include one or more trained neural networks in performing its determinations and/or assessments. FIG. 5 illustrates an example neural network, in accordance with various embodiments. As shown, example neural network 500 may be a multilayer feedforward neural network (FNN) comprising an input layer 512, one or more hidden layers 514 and an output layer 516. Input layer 512 receives data of input variables ($x_i$) 502. Hidden layer(s) 514 processes the inputs, and eventually, output layer 516 outputs the determinations or assessments ($y_i$) 504. In one example implementation the input variables ($x_i$) 502 of the neural network are set as a vector containing the relevant variable data, while the output determination or assessment ($y_i$) 504 of the neural network are also as a vector.

Multilayer feedforward neural network (FNN) may be expressed through the following equations:

$$ho_i = f(\textstyle\sum_{j=1}^{R}(iw_{i,j}x_j) + hb_i), \text{ for } i=1, \ldots, N$$

$$y_i = f(\textstyle\sum_{k=1}^{N}(hw_{i,k}ho_k) + ob_i), \text{ for } i=1, \ldots, S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \textstyle\sum_{k=1}^{m}(E_k), \text{ where } E_k = \textstyle\sum_{p=1}^{S}(t_{kp} - y_{kp})^2$$

where $y_{kp}$ and $t_{kp}$ are the predicted and the target values of pth output unit for sample k, respectively, and m is the number of samples.

In some embodiments, apparatus 200 may include a pre-trained neural network 500 to evaluate various factors such as vehicle speed, speed relative to detected objects, other factors such as vehicle and road conditions, and whether the vehicle will approach a detected object within the predetermined distance threshold. The input variables ($x_i$) 502 may include objects recognized from the images of the outward facing cameras as well as remote data sources, distance and speed vectors for the recognized objects; the readings of various vehicles sensors, such as accelerometer, gyroscopes, IMU, and so forth, from both local sensors 210 as well as sensor data received from remote data sources; and parameters of the proposed maneuver to be executed by first vehicle 102. The output variables ($y_i$) 504 may include values indicating whether first vehicle 102 will collide with any of the recognized objects, and the expected minimum distance that first vehicle 102 will come within each vehicle while executing the proposed maneuver. The network variables of the hidden layer(s) for the neural network of apparatus 200 for determining whether first vehicle 102 will collide with a recognized object and/or the minimum distance first vehicle 102 will come within each recognized object, are determined by the training data.

In the example of FIG. 5, for simplicity of illustration, there is only one hidden layer in the neural network. In some other embodiments, there can be many hidden layers. Furthermore, the neural network can be in some other types of topology, such as Convolution Neural Network (CNN), Recurrent Neural Network (RNN), and so forth.

Figure 6:
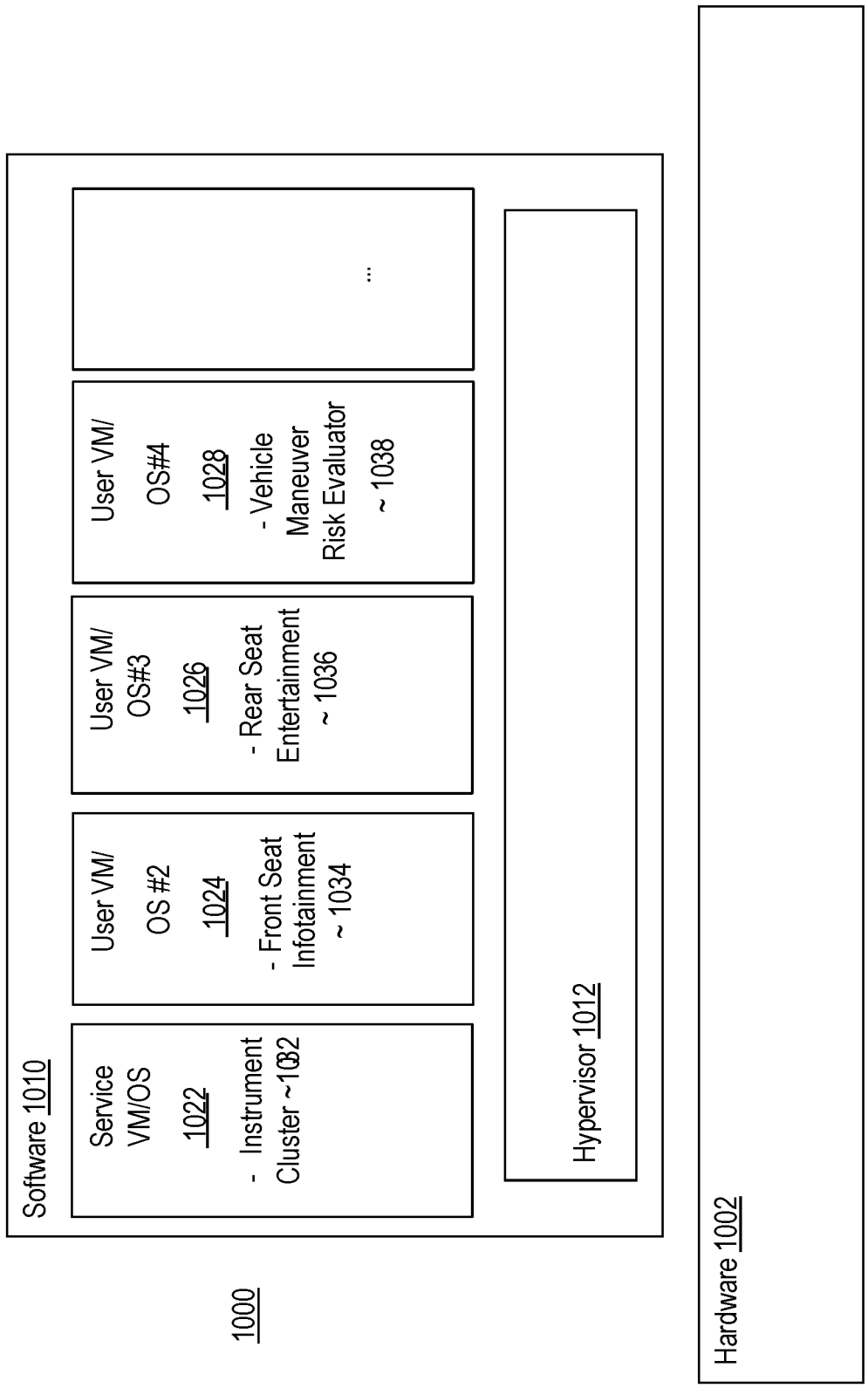
FIG. 6 illustrates a software component view of a possible implementation of apparatus of FIG. 2, according to various embodiments.

Referring now to FIG. 6, a possible software component view of a vehicle computer system 1000, which may implement apparatus 200 in software according to various embodiments, is illustrated. As shown, for the embodiments, vehicle computer system 1000 includes hardware 1002 which executed software 1010 in whole or in part. Vehicle computer system 1000 may provide some or all functionality of infotainment system 250 described above with respect to FIG. 2. Software 1010 includes hypervisor 1012 hosting a number of virtual machines (VMs) 1022-1028. Hypervisor 1012 is configured to host execution of VMs 1022-1028. The VMs 1022-1028 include a service VM 1022 and a number of user VMs 1024-1028. Service machine 1022 includes a service OS hosting execution of a number of instrument cluster applications 1032, which may include an instrument cluster display, such as display 258 for displaying the risk evaluation from apparatus 200. User VMs 1024-1028 may include a first user VM 1024 having a first user OS hosting execution of front seat infotainment applications 1034, a second user VM 1026 having a second user OS hosting execution of rear seat infotainment applications 1036, a third user VM 1028 having a third user OS hosting execution of a vehicle maneuver risk evaluator 1038 (implementing apparatus 200), and so forth.

Except for apparatus 200 providing a vehicle maneuver risk evaluator 1038 of the present disclosure incorporated, elements 1012-1036 of software 1010 may be any one of a number of these elements known in the art. For example, hypervisor 1012 may be any one of a number of hypervisors known in the art, such as KVM, an open source hypervisor, Xen, available from Citrix Inc, of Fort Lauderdale, Fla., or VMware, available from VMware Inc of Palo Alto, Calif., and so forth. Similarly, service OS of service VM 1022 and user OS of user VMs 1024-1028 may be any one of a number of OS known in the art, such as Linux, available e.g., from Red Hat Enterprise of Raliegh, N.C., or Android, available from Google of Mountain View, Calif.

Figure 7:
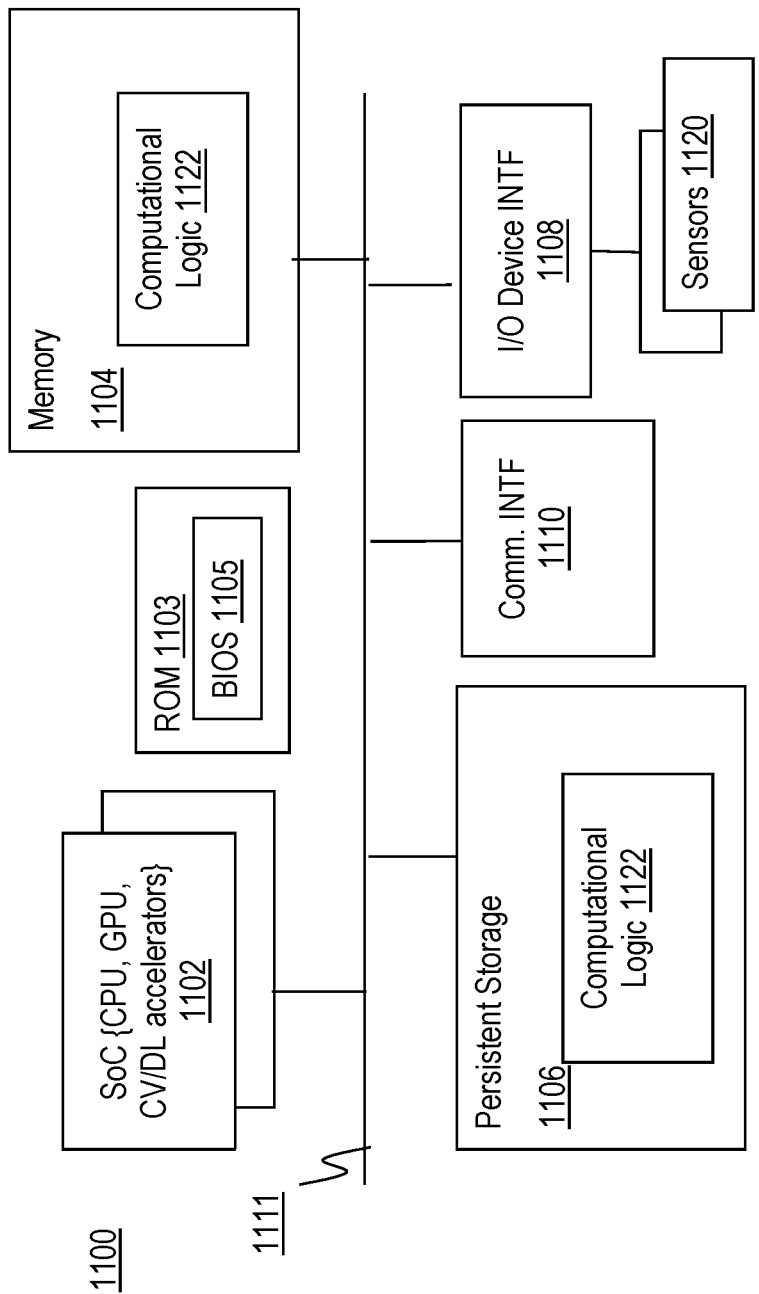
FIG. 7 illustrates a hardware component view of a possible implementation apparatus of FIG. 2, according to various embodiments.

Referring now to FIG. 7, an example computing platform that may be suitable for use to practice the present disclosure, according to various embodiments, is illustrated. As shown, computing platform 1100, which may be hardware 1002 of FIG. 6, may include one or more system-on-chips (SoCs) 1102, ROM 1103 and system memory 1104. Each SoCs 1102 may include one or more processor cores (CPUs), one or more graphics processor units (GPUs), one or more accelerators, such as computer vision (CV) and/or deep learning (DL) accelerators. ROM 1103 may include basic input/output system services (BIOS) 1105. CPUs, GPUs, and CV/DL accelerators may be any one of a number of these elements known in the art. Similarly, ROM 1103 and BIOS 1105 may be any one of a number of ROM and BIOS known in the art, and system memory 1104 may be any one of a number of volatile storage known in the art.

Additionally, computing platform 1100 may include persistent storage devices 1106. Example of persistent storage devices 1106 may include, but are not limited to, flash drives, hard drives, compact disc read-only memory (CD-ROM) and so forth. Further, computing platform 1100 may include one or more input/output (I/O) interfaces 1108 to interface with one or more I/O devices, such as sensors 1120. Other example I/O devices may include, but are not limited to, display, keyboard, cursor control and so forth. Computing platform 1100 may also include one or more communication interfaces 1110 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 1112, which may represent one or more buses. In the case of multiple buses, they may be bridged by one or more bus bridges (not shown).

Each of these elements may perform its conventional functions known in the art. In particular, ROM 1103 may include BIOS 1105 having a boot loader. System memory 1104 and mass storage devices 1106 may be employed to store a working copy and a permanent copy of the programming instructions implementing the operations associated with hypervisor 1012, service/user OS of service/user VM 1022-1028, and components of apparatus 200 (such as authenticator 202, validator 204, risk evaluator 206, object recognizer 208, and so forth), collectively referred to as computational logic 1122. The various elements may be implemented by assembler instructions supported by processor core(s) of SoCs 1102 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1204. Programming instructions 1204 may be configured to enable a device, e.g., computing platform 1100, in response to execution of the programming instructions, to implement (aspects of) hypervisor 1012, service/user OS of service/user VM 1022-1028, and components of vehicle maneuver risk evaluator 1038/apparatus 200 (such as authenticator 202, validator 204, risk evaluator 206, object recognizer 208, and so forth). In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

The following examples pertain to further embodiments.

Example 1 is an apparatus for computer-assisted or autonomous driving (CA/AD) vehicle, comprising an authenticator, disposed in a CA/AD vehicle, to authenticate a remote data source external to the CA/AD vehicle; a validator, disposed in the CA/AD vehicle, to validate at least one video stream received from the authenticated remote data source, through correlation of the at least one video stream with sensor data from one or more sensors in communication with the apparatus; and a risk evaluator, disposed in the CA/AD vehicle, to evaluate risk factors of a proposed vehicle maneuver, based at least in part on the at least one validated video stream and sensor data.

Example 2 includes the subject matter of example 1, or some other example herein, wherein the validator is to validate the at least one video stream through correlation of one or more objects recognized via object recognition from the at least one video stream, with one or more objects recognized from the sensor data.

Example 3 includes the subject matter of example 1 or 2, or some other example herein, wherein the risk evaluator is to evaluate the risk factors of the proposed vehicle maneuver based at least in part on the one or more objects recognized from the at least one video stream, and the sensor data.

Example 4 includes the subject matter of any of examples 1-3, or some other example herein, wherein the risk evaluator is to evaluate the risk factors of the proposed vehicle maneuver based at least in part on one or more of: location of each of the one or more recognized objects, path being traveled by each of the one or more recognized objects, speed of the one or more recognized objects, road surface conditions, and weather conditions.

Example 5 includes the subject matter of any of examples 1-4, or some other example herein, wherein the risk evaluator is in communication with a display device, and is to cause the display device to present an indication of the evaluated risk factors to an operator of the CA/AD vehicle.

Example 6 includes the subject matter of any of examples 1-5, or some other example herein, wherein the validator is to further validate the at least one video stream with a second video stream from a second authenticated remote data source.

Example 7 includes the subject matter of any of examples 1-6, or some other example herein, wherein the one or more sensors are sensors located on the CA/AD vehicle, and the validator is further to validate remote sensor data received from the authenticated remote data source.

Example 8 includes the subject matter of any of examples 1-7, or some other example herein, wherein the risk evaluator is to evaluate the risk factors based at least in part on the remote sensor data.

Example 9 includes the subject matter of any of examples 1-8, or some other example herein, wherein the one or more sensors include one or more of a LIDAR sensor, a video camera, a radar, or a depth sensor.

Example 10 includes the subject matter of any of examples 1-9, or some other example herein, wherein the remote data source comprises another CA/AD vehicle, or a stationary camera external to the CA/AD vehicle.

Example 11 includes the subject matter of any of examples 1-10, or some other example herein, wherein the apparatus is part of an in-vehicle infotainment system of the CA/AD vehicle.

Example 12 is a method, comprising authenticating a remote data source external to a computer-assisted or autonomous driving (CA/AD) vehicle; receiving remote sensor data from the authenticated remote data source; correlating the remote sensor data with local sensor data from one or more sensors located on the CA/AD vehicle to obtain validated sensor data; and evaluating risk factors of a proposed vehicle maneuver based at least in part upon the validated sensor data.

Example 13 includes the subject matter of example 12, or some other example herein, wherein the remote sensor data comprises at least one video stream.

Example 14 includes the subject matter of example 12 or 13, or some other example herein, wherein correlating further comprises performing object recognition upon the at least one video stream; and validating the local sensor data with recognized objects from the at least one video stream.

Example 15 includes the subject matter of any of examples 12-14, or some other example herein, wherein evaluating risk factors of the proposed vehicle maneuver comprises evaluating the risk factors based at least in part on the one or more objects recognized from the at least one video stream, and the sensor data.

Example 16 includes the subject matter of any of examples 12-15, or some other example herein, wherein evaluating the risk factors comprises evaluating the risk factors of the proposed vehicle maneuver based at least in part on one or more of: location of each of the one or more recognized objects, path being traveled by each of the one or more recognized objects, speed of the one or more recognized objects, road surface conditions, and weather conditions.

Example 17 includes the subject matter of any of examples 12-16, or some other example herein, further comprising displaying a risk assessment based upon the evaluated risk factors to an operator of the CA/AD vehicle.

Example 18 includes the subject matter of any of examples 12-17, or some other example herein, further comprising determining whether to execute the proposed vehicle maneuver based upon the evaluated risk factors.

Example 19 includes the subject matter of any of examples 12-18, or some other example herein, further comprising validating the at least one video stream with a second video stream from a second authenticated remote data source.

Example 20 includes the subject matter of any of examples 12-19, or some other example herein, wherein the one or more sensors are sensors located on the CA/AD vehicle, and further comprising validating remote sensor data received from the authenticated remote data source.

Example 21 includes the subject matter of any of examples 12-20, or some other example herein, further comprising evaluating the risk factors based at least in part on the remote sensor data.

Example 22 includes the subject matter of any of examples 12-21, or some other example herein, wherein the one or more sensors include one or more of a LIDAR sensor, a video camera, a radar, or a depth sensor.

Example 23 includes the subject matter of any of examples 12-22, or some other example herein, wherein the remote data source comprises another CA/AD vehicle, or a stationary camera external to the CA/AD vehicle.

Example 24 includes the subject matter of any of examples 12-23, or some other example herein, wherein the method is performed in whole or in part by an in-vehicle infotainment system of the CA/AD vehicle.

Example 25 is a transitory or non-transitory computer readable medium (CRM) containing instructions executable by a processor in a computer-assisted or autonomous driving (CA/AD) vehicle, that when executed cause the processor to authenticate a remote data source external to the CA/AD vehicle; validate remote sensor data received from the authenticated remote data source, the remote sensor data including at least one video stream, through correlation of the remote sensor data with local sensor data from one or more sensors located upon the CA/AD vehicle in communication with the apparatus; and evaluate risk factors of a proposed vehicle maneuver based at least in part upon the validated remote sensor data and local sensor data.

Example 26 includes the subject matter of example 25, or some other example herein, wherein the instructions are further to cause the processor to evaluate the risk factors of the proposed vehicle maneuver based at least in part on one or more of: location of each of one or more objects recognized from the validated remote sensor data and local sensor data, a path being traveled by each of the one or more recognized objects, a speed of the one or more recognized objects, road surface conditions, and weather conditions.

Example 27 includes the subject matter of example 25 or 26, or some other example herein, wherein the instructions are further to cause the processor to display to an operator of the CA/AD vehicle a visual indication of a risk assessment based upon the evaluated risk factors.

Example 28 includes the subject matter of any of examples 25-27, or some other example herein, wherein the processor is part of an in-vehicle infotainment system.

Example 29 includes the subject matter of any of examples 25-28, or some other example herein, wherein the remote sensor data comprises at least one video feed from a video camera external to the CA/AD vehicle.

Example 30 includes the subject matter of any of examples 25-29, or some other example herein, wherein the instructions are further to cause the processor to evaluate the risk factors of the proposed vehicle maneuver based at least in part on the one or more objects recognized from the at least one video stream, and the sensor data.

Example 31 includes the subject matter of any of examples 25-30, or some other example herein, wherein the instructions are further to cause the processor to validate the at least one video stream with a second video stream from a second authenticated remote data source.

Example 32 includes the subject matter of any of examples 25-31, or some other example herein, wherein the one or more sensors are sensors located on the CA/AD vehicle, and the instructions are further to cause the processor to validate remote sensor data received from the authenticated remote data source.

Example 33 includes the subject matter of any of examples 25-32, or some other example herein, wherein the instructions are further to cause the processor to evaluate the risk factors based at least in part on the remote sensor data.

Example 34 includes the subject matter of any of examples 25-33, or some other example herein, wherein the one or more sensors include one or more of a LIDAR sensor, a video camera, a radar, or a depth sensor.

Example 35 includes the subject matter of any of examples 25-34, or some other example herein, wherein the remote data source comprises another CA/AD vehicle, or a stationary camera external to the CA/AD vehicle.

Example 36 includes the subject matter of any of examples 25-35, or some other example herein, wherein the instructions on the CRM are executed in whole or in part by an in-vehicle infotainment system of the CA/AD vehicle.

Example 37 is an apparatus for a computer-assisted or autonomous driving (CA/AD) vehicle, comprising means to authenticate each of a plurality of remote data sources external to the CA/AD vehicle; means to validate remote sensor data received from each of the plurality of authenticated remote data sources, through correlation of the remote sensor data received from each of the plurality of authenticated remote data sources with the remote sensor data received from the remaining authenticated remote data sources; and means to evaluate risk factors of a proposed vehicle maneuver based at least in part upon the validated remote sensor data.

Example 38 includes the subject matter of example 37, or some other example herein, wherein the remote sensor data comprises at least two video streams.

Example 39 includes the subject matter of example 37 or 38, or some other example herein, wherein the means to validate is to correlate the remote sensor data through: object recognition performed on a first of the at least two video streams; object recognition performed on a second of the at least two video streams; and a comparison of objects recognized in the first video stream with objects recognized in the second video stream.

Example 40 includes the subject matter of example 39, or some other example herein, wherein the means to evaluate risk factors is to evaluate the risk factors of the proposed vehicle maneuver based at least in part on the one or more objects recognized from the at least two video stream, and the remote sensor data.

Example 41 includes the subject matter of any of examples 37-40, or some other example herein, wherein the means to evaluate risk factors is to evaluate the risk factors of the proposed vehicle maneuver based at least in part on one or more of: location of each of the one or more recognized objects, path being traveled by each of the one or more recognized objects, speed of the one or more recognized objects, road surface conditions, and weather conditions.

Example 42 includes the subject matter of any of examples 37-41, or some other example herein, wherein the means to evaluate risk is in communication with a display device, and is to cause the display device to present an indication of the evaluated risk factors to an operator of the CA/AD vehicle.

Example 43 includes the subject matter of any of examples 37-42, or some other example herein, further comprising one or more sensors located on the CA/AD vehicle, and wherein the means to validate is further to validate the remote sensor data with sensor data from the one or more sensors located on the CA/AD vehicle.

Example 44 includes the subject matter of any of examples 37-43, or some other example herein, wherein the means to evaluate risk is to evaluate the risk factors based at least in part on the sensor data from the one or more sensors located on the CA/AD vehicle.

Example 45 includes the subject matter of example 43 or 44, or some other example herein, wherein the one or more sensors include one or more of a LIDAR sensor, a video camera, a radar, or a depth sensor.

Example 46 includes the subject matter of any of examples 37-45, or some other example herein, wherein at least one of the plurality of remote data source comprises another CA/AD vehicle, or a stationary camera external to the CA/AD vehicle.

Example 47 includes the subject matter of any of examples 37-46, or some other example herein, wherein the apparatus is part of an in-vehicle infotainment system of the CA/AD vehicle.

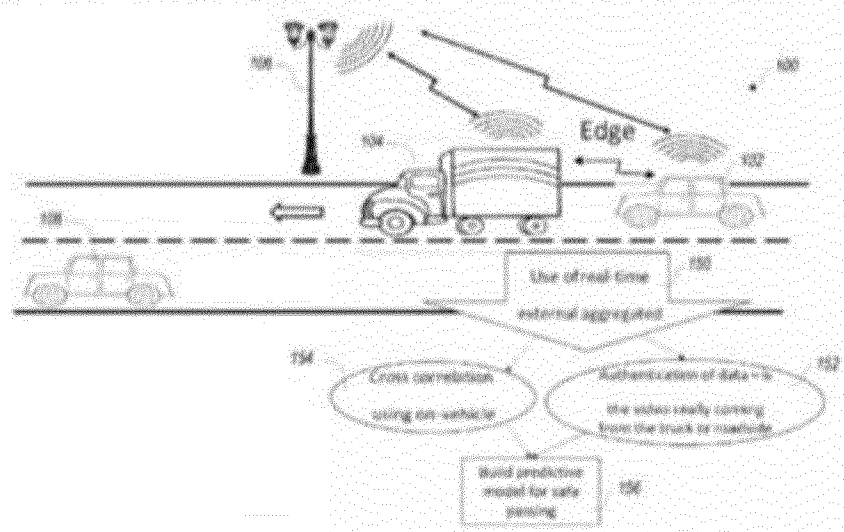

What is claimed is:

1. An apparatus for a computer-assisted or autonomous driving (CA/AD) vehicle, comprising:
   an authenticator, disposed in the CA/AD vehicle, to authenticate a remote data source external to the CA/AD vehicle;
   a validator, disposed in the CA/AD vehicle, to validate at least one video stream received from the authenticated remote data source, by correlation of the at least one video stream with sensor data from one or more sensors in communication with the apparatus to obtain a validated video stream that is relevant to a proposed vehicle maneuver; and
   a risk evaluator, disposed in the CA/AD vehicle, to evaluate risk factors of the proposed vehicle maneuver prior to execution for a risk of collision and determine whether the proposed vehicle maneuver is safe to execute, based at least in part on the at least one validated video stream and sensor data, the validated video stream and sensor data received in real time, and to cause a qualitative assessment of the evaluation to be displayed, on a display, to an operator of the CA/AD vehicle;
   wherein the proposed vehicle maneuver is determined based on input to a steering system, a brake, a throttle, or a turn signal of the vehicle by the operator in the vehicle;
   wherein the sensor data comprises a second video stream; and
   wherein the validator is to correlate the at least one video stream with sensor data through:
      object recognition performed on the at least one video stream;
      object recognition performed on the second video stream; and
      a comparison of objects recognized in the at least one video stream with objects recognized in the second video stream.

2. The apparatus of claim 1, wherein the validator is to validate the at least one video stream through correlation of one or more objects recognized via object recognition from the at least one video stream, with one or more objects recognized from the sensor data.

3. The apparatus of claim 2, wherein the risk evaluator is to evaluate the risk factors of the proposed vehicle maneuver based at least in part on the one or more objects recognized from the at least one video stream, and the sensor data.

4. The apparatus of claim 3, wherein the risk evaluator is to evaluate the risk factors of the proposed vehicle maneuver based at least in part on one or more of: location of each of the one or more recognized objects, a path being traveled by each of the one or more recognized objects, a speed of the one or more recognized objects, road surface conditions, and weather conditions.

5. The apparatus of claim 1, wherein the risk evaluator is in communication with a display device, and is to cause the display device to display the assessment to an operator of the CA/AD vehicle.

6. The apparatus of claim 1, wherein the validator is to further validate the at least one video stream with a second video stream from a second authenticated remote data source.

7. The apparatus of claim 1, wherein the one or more sensors are sensors located on the CA/AD vehicle, and the validator is further to validate remote sensor data received from the authenticated remote data source.

8. The apparatus of claim 7, wherein the risk evaluator is to evaluate the risk factors based at least in part on the remote sensor data.

9. The apparatus of claim 1, wherein the one or more sensors include one or more of a LIDAR sensor, a video camera, a radar, or a depth sensor.

10. The apparatus of claim 1, wherein the remote data source comprises another CA/AD vehicle, or a stationary camera external to the CA/AD vehicle.

11. The apparatus of claim 1, wherein the apparatus is part of an in-vehicle infotainment system of the CA/AD vehicle.

12. A method, comprising:
authenticating a remote data source external to a computer-assisted or autonomous driving (CA/AD) vehicle;
receiving, at the CA/AD vehicle, remote sensor data from the authenticated remote data source;
correlating, at the CA/AD vehicle, the remote sensor data with local sensor data from one or more sensors located on the CA/AD vehicle to obtain validated sensor data that is relevant to a proposed vehicle maneuver;
evaluating, prior to execution of the proposed vehicle maneuver, for a risk of collision and to determine whether the proposed vehicle maneuver is safe to execute, risk factors of the proposed vehicle maneuver based at least in part upon the validated sensor data, the validated sensor data received in real time; and
displaying, on a display, to an operator of the CA/AD vehicle, a qualitative assessment of the evaluation,
wherein the proposed vehicle maneuver is determined based on driver input to a steering system, a brake, a throttle, or a turn signal of the vehicle by an operator in the vehicle;
wherein the remote sensor data comprises a first video stream and the local sensor data comprises a second video stream; and
wherein the correlating includes:
performing object recognition on the first video stream;
performing object recognition on the second video stream; and
comparing objects recognized in the first video stream with objects recognized in the second video stream.

13. The method of claim 12, wherein evaluating the risk factors comprises evaluating the risk factors of the proposed vehicle maneuver based at least in part on one or more of: location of each of the one or more recognized objects, a path being traveled by each of the one or more recognized objects, a speed of the one or more recognized objects, road surface conditions, and weather conditions.

14. The method of claim 13, further comprising determining whether to execute the proposed vehicle maneuver based upon the evaluated risk factors.

15. A non-transitory computer readable medium (CRM) containing instructions executable by a processor in a computer-assisted or autonomous driving (CA/AD) vehicle, that when executed cause the processor to:

authenticate a remote data source external to the CA/AD vehicle;
validate remote sensor data received from the authenticated remote data source, the remote sensor data including at least one video stream, by correlation of the remote sensor data with local sensor data from one or more sensors located upon the CA/AD vehicle in communication with the apparatus to obtain a validated video stream that is relevant to a proposed vehicle maneuver;
evaluate, prior to execution of the proposed vehicle maneuver, for a risk of collision and to determine whether the proposed vehicle maneuver is safe to execute, risk factors of the proposed vehicle maneuver based at least in part upon the validated remote sensor data and local sensor data, the validated remote sensor data and local sensor data received in real time; and
display, on a display, to an operator of the CA/AD vehicle, a qualitative assessment of the evaluation,
wherein the proposed vehicle maneuver is determined based on driver input to vehicle controls by an operator in the vehicle, wherein the vehicle controls include one or more of a steering system of the vehicle, a brake of the vehicle, a throttle of the vehicle, and a turn signal of the vehicle;
wherein the local sensor data includes a second video stream; and
wherein correlation of the remote sensor data with local sensor data includes:
object recognition performed on the at least one video stream;
object recognition performed on the second video stream; and
a comparison of objects recognized in the at least one video stream with objects recognized in the second video stream.

16. The CRM of claim 15, wherein the instructions are further to cause the processor to evaluate the risk factors of the proposed vehicle maneuver based at least in part on one or more of: location of each of one or more objects recognized from the validated remote sensor data and local sensor data, a path being traveled by each of the one or more recognized objects, a speed of the one or more recognized objects, road surface conditions, and weather conditions.

17. The CRM of claim 15, wherein the instructions are further to cause the processor to display the assessment to an operator of the CA/AD vehicle as a visual indication of a risk assessment based upon the evaluated risk factors.

18. The CRM of claim 15, wherein the processor is part of an in-vehicle infotainment system.

19. The CRM of claim 15, wherein the remote sensor data comprises at least one video feed from a video camera external to the CA/AD vehicle.

20. An apparatus for a computer-assisted or autonomous driving (CA/AD) vehicle, comprising:
means to authenticate each of a plurality of remote data sources external to the CA/AD vehicle;
means to validate remote sensor data received from each of the plurality of authenticated remote data sources, by correlation of the remote sensor data received from each of the plurality of authenticated remote data sources with the remote sensor data received from the remaining authenticated remote data sources to obtain validated remote sensor data that is relevant to a proposed vehicle maneuver; and
means to evaluate risk factors of the proposed vehicle maneuver prior to execution for a risk of collision and determine whether the proposed vehicle maneuver is safe to execute based at least in part upon the validated remote sensor data, the validated remote sensor data received in real time, and to cause a qualitative assessment of the evaluation to be displayed, on a display, to an operator of the CA/AD vehicle, wherein the proposed vehicle maneuver is determined based on driver input to a steering system, a brake, a throttle, or a turn signal of the vehicle by an operator in the vehicle;

wherein the sensor data received from each of the plurality of authenticated remote data sources includes at least a first video stream;

wherein the sensor data received from the remaining authenticated remote data sources includes at least a second video stream; and wherein the correlation includes:
- object recognition performed on the first video stream;
- object recognition performed on the second video stream; and
- a comparison of objects recognized in the first video stream with objects recognized in the second video stream.

* * * * *

UNITED STATES PATENT AND TRADEMARK OFFICE
CERTIFICATE OF CORRECTION

PATENT NO. : 11,584,368 B2
APPLICATION NO. : 16/139805
DATED : February 21, 2023
INVENTOR(S) : Naissa Conde et al.

It is certified that error appears in the above-identified patent and that said Letters Patent is hereby corrected as shown below:

On the Title Page

Replace the title page with the attached title page showing the corrected number of claims.

In the Claims

Column 23
Lines 1-4, "Claim 6. The apparatus of claim 1, wherein the validator is to further validate the at least one video stream with a second video stream from a second authenticated remote data source." should be identified as (Canceled).

Signed and Sealed this
Tenth Day of September, 2024

Katherine Kelly Vidal
*Director of the United States Patent and Trademark Office*